United States Patent [19]

Zimmerman et al.

[11] Patent Number: 5,521,726
[45] Date of Patent: May 28, 1996

[54] POLARIZER WITH AN ARRAY OF TAPERED WAVEGUIDES

[75] Inventors: Scott Zimmerman, Basking Ridge; Paul Ferm, Morristown; Lawrence Shacklette, Maplewood; Michael McFarland, Washington, all of N.J.

[73] Assignee: AlliedSignal Inc., Morristown, N.J.

[21] Appl. No.: 296,569

[22] Filed: Aug. 26, 1994

[51] Int. Cl.⁶ ................................................. G02F 1/1335
[52] U.S. Cl. ............................................... 359/42; 359/63
[58] Field of Search ................................. 359/40, 41, 42, 359/63

[56] References Cited

U.S. PATENT DOCUMENTS

| Re. 33,987 | 7/1992 | Suzawa | 359/49 |
|---|---|---|---|
| 1,942,841 | 1/1934 | Shimizu | 88/24 |
| 3,180,214 | 4/1965 | Fox | 88/28.9 |
| 3,218,924 | 11/1965 | Miller | 88/28.93 |
| 3,279,314 | 10/1966 | Miller | 88/28.93 |
| 3,704,055 | 11/1972 | Hong | 350/128 |
| 4,240,692 | 12/1980 | Winston | 350/96.10 |
| 4,298,246 | 11/1981 | Iwamura | 350/122 |
| 4,379,617 | 4/1983 | Funakoshi et al. | 350/126 |
| 4,573,764 | 3/1986 | Bradley | 350/128 |
| 4,605,283 | 8/1986 | Stanton | 350/127 |
| 4,606,609 | 8/1986 | Hong | 350/128 |
| 4,660,930 | 4/1987 | van der Hoorn et al. | 350/128 |
| 4,666,248 | 5/1987 | van de Ven | 350/128 |
| 4,679,900 | 7/1987 | McKechnie et al. | 350/126 |
| 4,682,853 | 7/1987 | Broer et al. | 350/128 |
| 4,688,093 | 8/1987 | van der Staak et al. | 350/128 |
| 4,692,359 | 9/1987 | Fitzpatrick | 427/45.1 |
| 4,695,135 | 9/1987 | Den Exter Blokland | 350/452 |
| 4,701,019 | 10/1987 | Fitzpatrick | 350/127 |
| 4,701,020 | 10/1987 | Bradley, Jr. | 350/128 |
| 4,721,361 | 1/1988 | van den Ven | 350/128 |
| 4,725,448 | 2/1988 | Fitzpatrick | 427/45.1 |
| 4,730,897 | 3/1988 | McKechnie et al. | 350/128 |
| 4,751,509 | 6/1988 | Kubota et al. | 340/784 |
| 4,762,393 | 8/1988 | Gerritsen et al. | 350/128 |
| 4,767,186 | 8/1988 | Bradely, Jr. et al. | 350/128 |
| 4,776,670 | 10/1988 | Kessels et al. | 350/252 |
| 4,874,227 | 10/1989 | Matsukawa et al. | 350/334 |

(List continued on next page.)

FOREIGN PATENT DOCUMENTS

| 525755A1 | 7/1993 | European Pat. Off. . | |
| 55-110217 | 8/1980 | Japan | 359/42 |
| 56-91896 | 12/1982 | Japan . | |
| 56-212584 | 7/1983 | Japan . | |
| 58-105341 | 4/1985 | Japan . | |
| 60-165622 | 8/1985 | Japan . | |
| 60-241024 | 11/1985 | Japan . | |
| 61-309311 | 7/1988 | Japan . | |
| 1017471 | 1/1966 | United Kingdom . | |

OTHER PUBLICATIONS

Ultra-Wide Viewing Angle Rear Projection Television Screen; Ralph Bradley, Jr.; pp. 185–193 (1985).

*Primary Examiner*—Anita Pellman Gross
*Assistant Examiner*—Charles Miller
*Attorney, Agent, or Firm*—Melanie L. Brown; Roger H. Criss

[57] ABSTRACT

The present invention includes a polarizer element and an array of tapered waveguides in substantial contact with the polarizer element. The tapered end of each of the waveguides extends outward from the polarizer element. Each of the waveguides has a light input surface adjacent the polarizer element and a light output surface distal from the light input surface. The area of the light input surface of each of the waveguides is greater than the area of its light output surface. Also, the waveguides in the array are separated by interstitial regions with a lower refractive index than the refractive index of the waveguides. The present improved polarizer may be used in display devices, such as projection display devices, off screen display devices, and direct view displays. Such displays are used in a wide range of applications including computer terminals, airplane cockpit displays, automotive instrument panels, televisions, and other devices that provide text, graphics, or video information.

21 Claims, 4 Drawing Sheets

U.S. PATENT DOCUMENTS

| | | | |
|---|---|---|---|
| 4,955,937 | 9/1990 | Dona et al. | 82/1.11 |
| 4,964,695 | 10/1990 | Bradley, Jr. | 350/129 |
| 5,005,945 | 4/1991 | van de Ven | 350/128 |
| 5,035,490 | 7/1991 | Hubby, Jr. | 359/63 |
| 5,076,661 | 12/1991 | Bradley | 359/456 |
| 5,101,279 | 3/1992 | Kurematsu et al. | 358/241 |
| 5,132,830 | 7/1992 | Fukutani et al. | 359/67 |
| 5,151,801 | 9/1992 | Hiroshima | 359/40 |
| 5,159,478 | 10/1992 | Akiyama et al. | 359/69 |
| 5,396,351 | 3/1995 | Gessel | 359/63 |
| 5,442,467 | 8/1995 | Silverstein et al. | 359/69 |

POLARIZER WITH AN ARRAY OF TAPERED WAVEGUIDES

BACKGROUND OF THE INVENTION

The present invention relates to an improved polarizer comprising a polarizer element and an array of tapered waveguides in substantial contact with the polarizer element.

Optical waveguides, also known in the art as light transmissive devices or lightguides, find application in display devices, such as for example projection display devices, off screen display devices, and direct view displays. See for example U.S. Pat. Nos. 3,218,924 and 3,279,314 to Miller and U.S. Pat. No. 4,767,186 to Bradley, Jr. et al. Such displays are used in a wide range of applications including computer terminals, airplane cockpit displays, automotive instrument panels, televisions, and other devices that provide text, graphics, or video information.

Such displays usually consist of a laminate of a liquid crystal element between two pieces of glass or plastic film. The inner surface of the glass is rubbed or otherwise treated to induce a preferred orientation of the liquid crystalline molecules near its surface. The operation of a liquid crystal device under a back lighting arrangement requires that polarizers be employed on the inner (back) and outer sides. The direction of orientation of the liquid crystals together with the specification of a "normally on" or "normally off" device dictates the required orientation of the inside and outside polarizers. It is generally desirable to spread light anisotropically from a display device and thus, send increased amounts of light into the horizontal plane (zx) and less into the vertical plane (zy).

One embodiment of a direct view display device based on a liquid crystal material is the twisted nematic (TN) liquid crystal display device. In this embodiment, a nematic liquid crystal medium is sandwiched between substrates which are treated so as to cause spontaneous alignment of liquid crystal molecules parallel to the plane of the substrate. If the two substrates are oriented so that alignment at each substrate differs by 90 degrees, then the liquid crystal molecules will undergo a 90 degree orientation change throughout the thickness of the medium. For reasonable spacing of the substrates (typically about 5 micrometers), this configuration has the property of rotating the polarization of light incident normal to the plane of the substrates by 90 degrees. If an electric potential is applied between the substrates (typically a few volts), then the order of the liquid crystal molecules is altered. In the presence of the potential, the molecules will tend to align perpendicular to the substrate and the 90 degree rotation will be destroyed. Thus the polarization of light incident normal to the surface of the substrate will be unaltered in the presence of the electric potential. Based on these principles, direct view twisted nematic (TN) liquid crystal devices may be constructed which are either normally black (NB) in the absence of the potential or which are normally white (NW) in the absence of the potential.

As an example, a typical normally white display consists of a TN liquid crystal cell as described above fitted with polarizers elements on either side of the cell so that unpolarized light incident normal to the plane of the device is linearly polarized as it enters the device. The polarization is rotated by 90 degrees as the light transverses the cell. The light is then transmitted by the second polarizer element which is oriented at 90 degrees to the first polarizer element. Thus in the absence of an electric potential, light incident normal to the device is transmitted through the structure. When an electric potential is applied between the substrates, the medium no longer rotates the polarization by 90 degrees. Thus light which is incident normal to the structure is rejected by the second polarizer element and not transmitted. In this way, image information contained in the pattern of applied electric potential is presented as a decrease in light as seen by the viewer. This is the operating principle of a simple twisted nematic normally white (NW) display.

It is generally a shortcoming of such display devices that insufficient light is projected into higher angles and thus, viewability is limited to a narrow angular range around the normal to the plane of the liquid crystal device, i.e., the z-axis. Another shortcoming is that when viewed at high angle to the normal of the plane, the quality of the image is degraded, i.e., it exhibits undesirable color shift, limited gray scale, low contrast, and low sharpness.

As such, the need exists in the art for a display device wherein viewability around the normal to the plane of the liquid crystal device is improved and the quality of an image when viewed at high angle is also improved.

SUMMARY OF THE INVENTION

We have developed an improved polarizer which responds to the foregoing need in the art. The present invention comprises: (a) a polarizer element; and (b) an array of tapered waveguides in substantial contact with the polarizer element wherein: (i) the tapered end of each of the waveguides extends outward from the polarizer element, (ii) each of the waveguides has a light input surface adjacent to the polarizer element (a) and a light output surface distal from the light input surface, (iii) the area of the light input surface of each of the waveguides is greater than the area of its light output surface, and (iv) the waveguides in the array are separated by interstitial regions with a lower refractive index than the refractive index of the waveguides. The interstitial region preferably includes a light absorbing material such as carbon black in order to absorb non-guided light and to reduce the surface reflectivity of the polarizer.

The present invention is advantageous to use because viewability around the normal to the plane of the liquid crystal device is improved and when viewed at high angle, the quality of the image is improved in that it exhibits better contrast and sharpness.

Other advantages of the present invention will be apparent from the following description, attached drawings, and attached claims.

DETAILED DESCRIPTION OF THE PREFERRED EMBODIMENTS

We have found that under illumination by anything other than perfectly collimated light, the functioning of the array of tapered waveguides is increasingly impaired when the array is separated from the liquid crystal cell by any distance greater than about the square root of the area of the input surface of the waveguide. Since the normal structure of a polarizer consists of at least three, if not five, layers, the simple lamination of a conventional polarizer with an array of tapered waveguides on a substrate results in an undesirably large gap between the liquid crystal element and the array of tapered waveguides. As shown in the Comparative below, this gap causes a particularly significant decrease in sharpness and contrast.

Thus, the present invention comprises: (a) a polarizer element; and (b) an array of tapered waveguides in substantial contact with the polarizer element. The term "substantial contact" as used herein means that the distance between the polarizer element and the array of tapered waveguides is less than about 250 microns. Preferably, the distance between the polarizer element and the array of tapered waveguides is from about 50 microns to about 0 microns, and most preferably from about 25 microns to about 0 microns. One advantage of placing the polarizer element and the array of tapered waveguides in close proximity is that the distance between the liquid crystal display device elements (pixels) and the array of tapered waveguides is minimized which results in an image with greater sharpness, contrast, and color purity.

Figure 1:
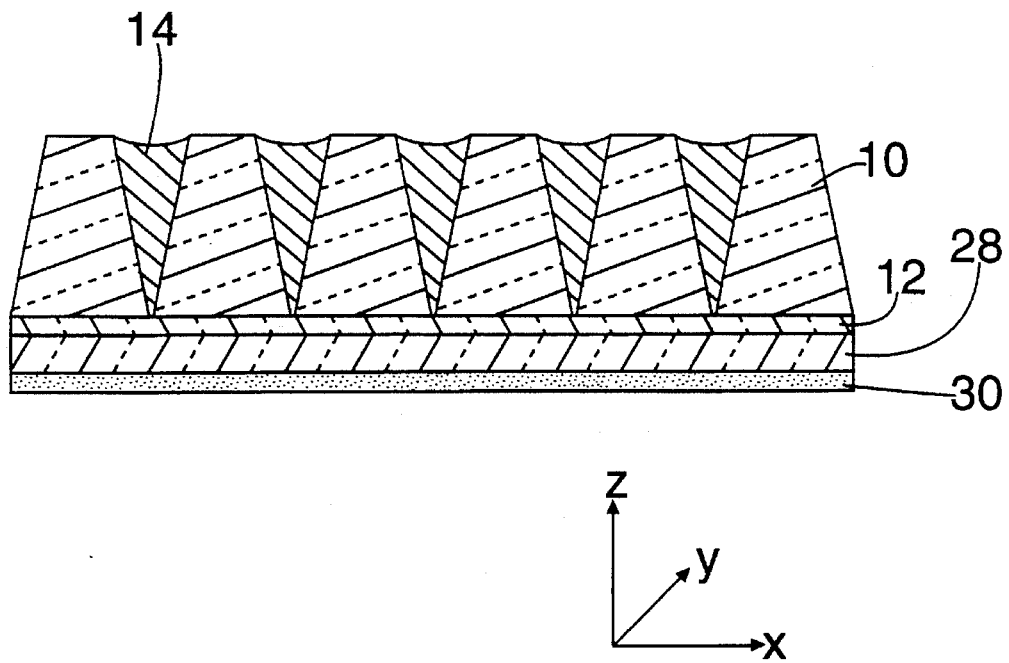
FIG. 1 illustrates a side cross-sectional view of the present improved polarizer.

Referring to FIG. 1, an array of tapered waveguides 10 is in substantial contact with a polarizer element 12. Each waveguide tapered end extends outward from the polarizer element 12. Each tapered waveguide has a light input surface adjacent to polarizer element 12 and a light output surface distal from the light input surface. The area of the light input surface of each tapered waveguide is greater than the area of its light output surface. The waveguides are separated by interstitial regions 14 having a lower refractive index than the refractive index of the waveguides.

Figure 2:
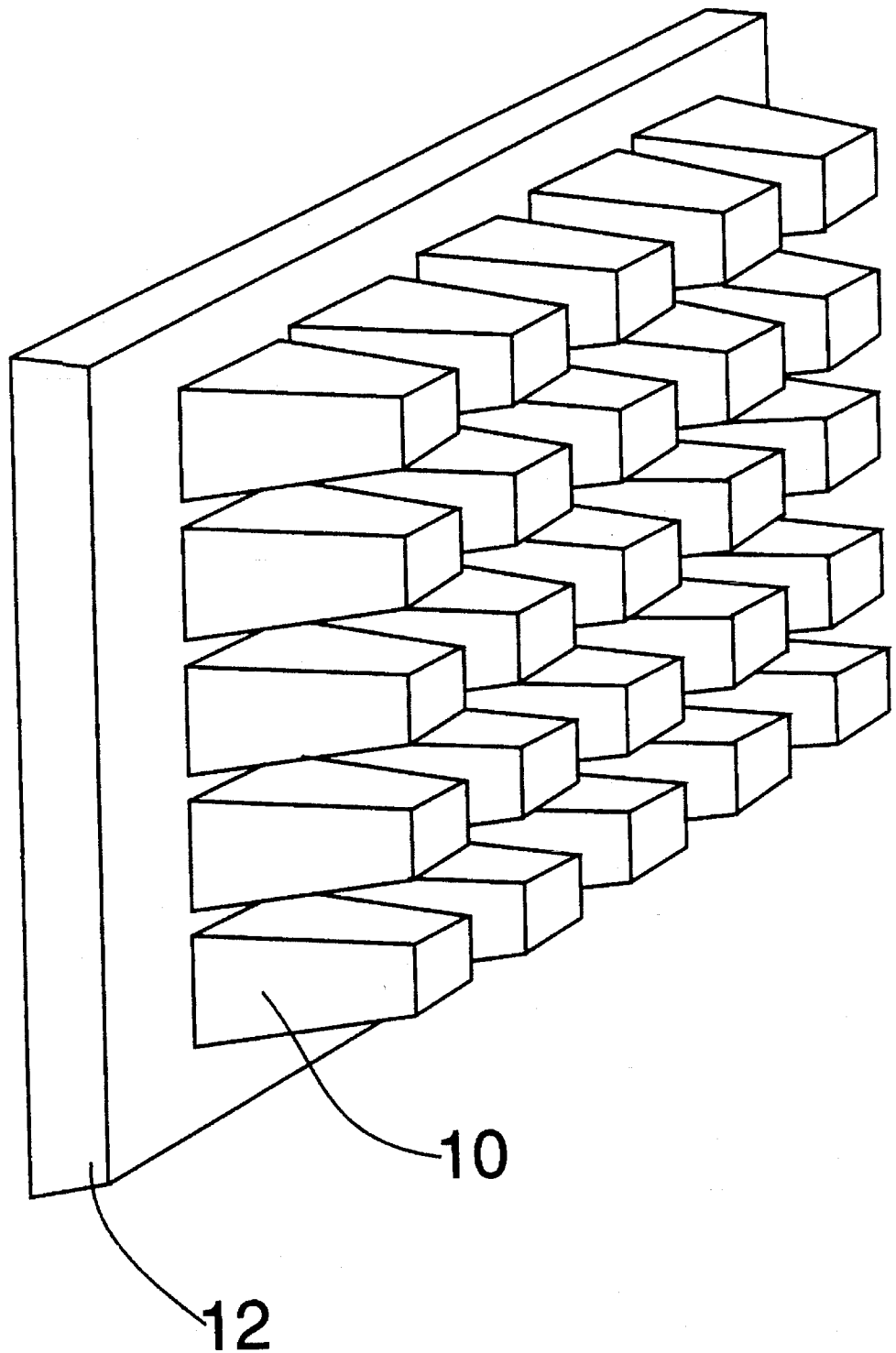
FIG. 2 is an array of tapered waveguides with rectangular cross sections viewed in perspective.
Figure 3:
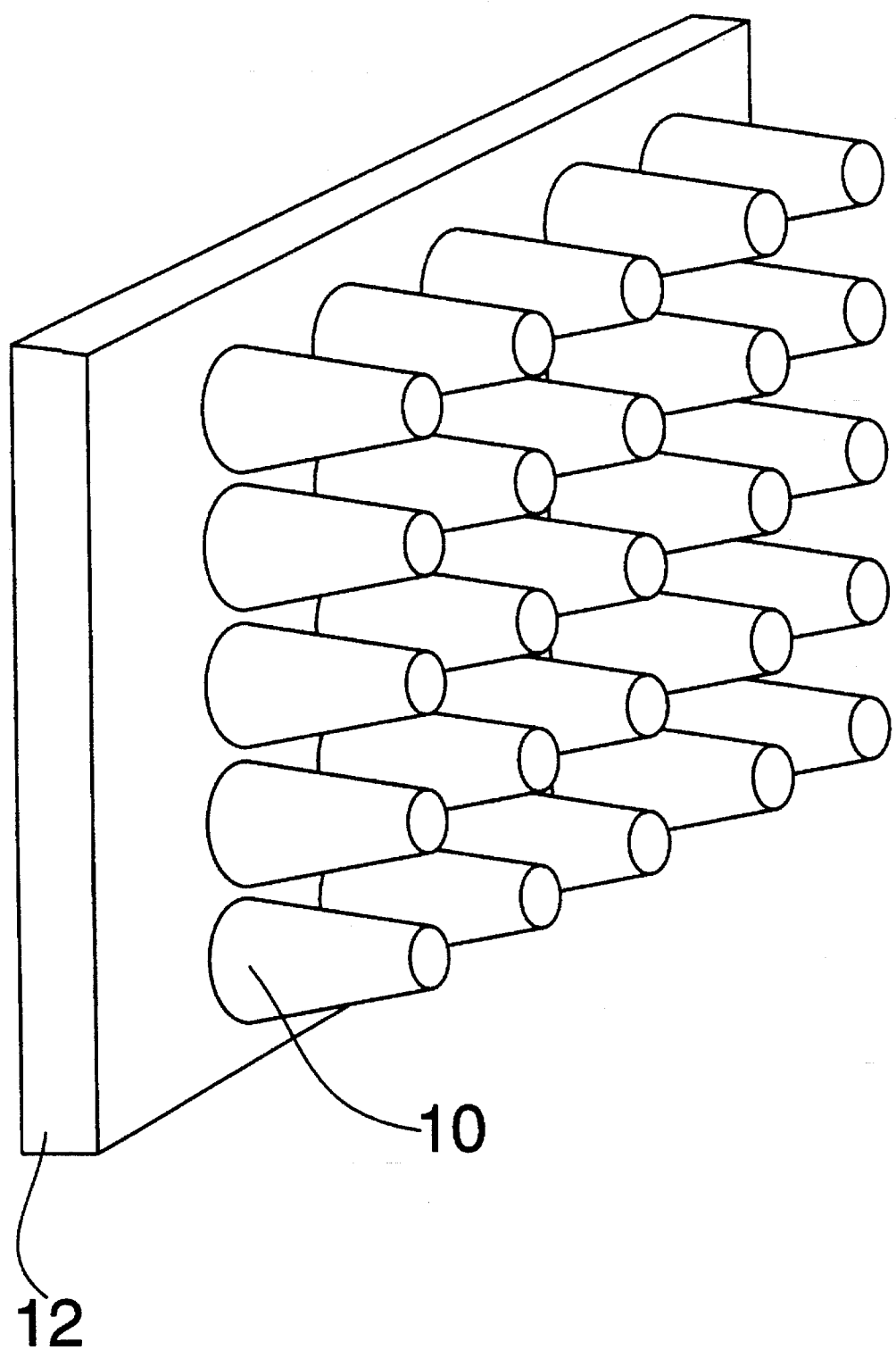
FIG. 3 is an array of tapered waveguides with round cross sections viewed in perspective.

Preferably, the cross section of the light input surface of each waveguide is from about 10 microns to about 100 microns and the cross section of the light output surface of each waveguide is from about 5 to about 50 microns. The cross section of a tapered waveguide in a plane parallel to the surface of polarizer element 12 may have any shape including a circle, square, hexagon, ellipse, and rectangle. FIG. 2 shows an array of tapered waveguides 10 with rectangular cross sections viewed in perspective. FIG. 3 shows an array of tapered waveguides 10 with circular cross sections viewed in perspective. The shape of sidewalls of the tapered waveguides 10 may be straight or curved.

When waveguide 10 has a taper such that the area of the light output surface is smaller than the area of light input surface, the angular distribution of the light emerging from the light output surface will be larger than the angular distribution of the light entering the light input surface. The present improved polarizer when used in a display will alter the angular distribution of the output light from a modulating means such that the image from the modulating means may be viewed at higher angles. The area of the light output surface of each tapered waveguide 10 is preferably from about 1 to about 50 percent of the area of the light input surface, more preferably from about 3 to about 25 percent of the area of the light input surface, and most preferably from about 4 to about 12 percent of the area of the light input surface.

In order that a display having the present improved polarizer therein has high overall light throughput, the sum of the areas for all waveguide light input surfaces is preferably greater than about 40 percent of the total areas of the substrate, more preferably greater than about 60 percent of the total areas of the substrate, and most preferably about 80 percent of the total areas of the substrate.

If the tapered straight sidewalls of a tapered waveguide 10 are extended until they intersect, they form a taper angle. The value of the taper angle ranges preferably from about 2 degrees to about 14 degrees, more preferably from about 4 degrees to about 12 degrees, and most preferably from about 6 degrees to about 10 degrees.

Tapered waveguide 10 has a height and a base dimension which is the minimum transverse distance across the waveguide light input surface. For example, if the light input surface has the shape of a square, the base dimension is the length of one side of the square. As another example, if the light input surface has the shape of a rectangle, the base dimension is the smaller of the two side dimensions of the rectangle. The specific values for the base dimension may vary widely depending on the center-to-center distance between adjacent pixels of a modulating means. In order that the resolution of the image formed by a modulating means not be degraded, the base dimension should be equal to or less than the center-to-center distance between adjacent pixels of a modulating means. For example, if the center-to-center distance between adjacent pixels in a modulating means is 200 microns, then the base dimension is preferably in the range from about 5 microns to about 200 microns, more preferably in the range from about 15 microns to about 200 microns, and most preferably from about 25 microns to about 100 microns.

After the base dimension is selected, the height of the tapered waveguide 10 may be specified by the ratio of height to the base dimension. The ratio of the height to the base dimension may vary widely depending on how much one wishes to increase the angular distribution of light emerging from the light output surface compared to the angular distribution of light entering the light input surface. The ratio of the height to the base dimension is preferably from about 0.25 to about 20, more preferably from about 1 to about 8, and most preferably from about 2 to about 4.

Another important feature of the array of tapered waveguides of the present invention is that the array may be designed to apportion light selectively such that, for instance, the viewability (or brightness) from side to side, i.e., horizontal angles in the zx plane, is enhanced at the expense of viewability at the top and bottom, i.e. vertical angles in the zy plane. One factor which contributes to obtaining the desired anisotropy in maximum viewing angle is the direction of polarization of the light which enters at the base of each tapered waveguide. The direction of polarization of the light propagating through the waveguide is determined by the relative orientation of the polarization direction in the polarizer element with the orientation of the waveguides. For example, enhanced transmission into the horizontal plane will be attained when the direction of polarization of the light is parallel to the zx plane. The relative portions of light being transmitted and internally reflected at the exit face (top) of the waveguide depends on the orientation of the polarization direction of the light with +respect to the plane of incidence on the exit face. Polarization parallel to the plane of incidence produces a higher proportion of transmitted light. At high viewing angles, greater than about 45 degrees, this effect, due solely to orienting the polarizing direction to lie parallel to the zx plane, will produce differences in light intensity at corresponding angles in the vertical and horizontal planes of greater than 10%, even when the waveguides themselves are highly symmetric (greater than 2-fold symmetry) such as those having square, circular, or hexagonal symmetry.

For applications which require higher viewability in the zx plane over that in the yz plane, two-fold symmetric tapered waveguide shapes may also preferably be employed, such as those with elliptical or rectangular cross section. The tapered waveguides are preferably oriented so that the major axis of their cross section or base lies parallel to the y axis and the minor axis lies parallel to the x axis. In this case, the anisotropy in light distribution may be still further enhanced by again orienting the polarizer element to provide light polarized in the zx plane.

Still other applications may require that the light emerging from the array of tapered waveguides be isotropic. In this instance, the preferred polarization direction would be at a 45-degree angle with respect to the x axis and the y axis, if multi-fold symmetric, e.g., square, hexagonal, or circular cross section, tapered waveguides are employed. Other directions of polarization could be accommodated to produce isotropic results by selective elongation of the tapered waveguides, e.g. to rectangular or elliptical cross section. Once the preferred polarization direction is determined with respect to the reference directions of the liquid crystal cell, i.e. the x, y, and z directions of FIG. 1, the rest of the full display must also comply. That is the rubbing direction of the liquid crystal display and the positioning of the rear polarizer must all be coordinated with the choice of polarization direction made for the improved polarizer.

The array of tapered waveguides is made of transparent solid polymer materials which have an index of refraction between about 1.45 and about 1.65 and include commercially available polymethylmethacrylate, poly(4-methylpentene), polycarbonate, polyester, polystyrene, and polymers formed by photopolymerization of acrylate or methacrylate monomers. Preferably, the array of tapered waveguides is made of a photopolymerizable material which comprises two essential ingredients. The first essential ingredient is a photopolymerizable monomer, especially an ethylenically unsaturated monomer which will provide a transparent solid polymer material. More preferred materials have an index of refraction between about 1.50 and about 1.60 and include polymers formed by photopolymerization of acrylate or methacrylate monomer mixtures composed of urethane acrylates or urethane methacrylates, ester acrylates or ester methacrylates, epoxy acrylates or epoxy methacrylates, poly(ethylene glycol) acrylates or poly(ethylene glycol) methacrylates or vinyl containing organic monomers. It is useful to utilize a mixture of monomers in the photopolymerizable mixture in order to fine tune the properties of the composition such as to fine tune crosslinking density, viscosity, adhesion, curing rate, and refractive index and to reduce discoloration, cracking, and delamination properties of the photopolymer formed from the composition.

Examples of useful more preferred monomers include methyl methacrylate; n-butyl acrylate (BA); 2-ethylhexyl acrylate (EHA); isodecyl acrylate; 2-hydroxyethyl acrylate; 2-hydroxypropyl acrylate; cyclohexyl acrylate (CHA); 1,4-butanediol diacrylate; ethoxylated bisphenol A diacrylate; neopentylglycol diacrylate (NPGDA); diethyleneglycol diacrylate (DEGDA); diethylene glycol dimethacrylate (PEGDMA); 1,6-hexanediol diacrylate (HDDA); trimethylol propane triacrylate (TMPTA); pentaerythritol triacrylate (PETA); pentaerythritol tetra-acrylate (PETTA); phenoxyethyl acrylate (PEA); β-carboxylethyl acrylate (β-CEA); isobornyl acrylate (IBOA); tetrahydrofurfuryl acrylate (THFFA); propylene glycol monoacrylate (MPPGA); 2-(2-ethoxyethoxy) ethyl acrylate (EOEOEA); N-vinyl pyrrolidone (NVP); 1,6-hexanediol dimethacrylate (HDDMA); triethylene glycol diacrylate (TEGDA) or dimethacrylate (TEGDMA); tetraethylene glycol diacrylate (TTEGDA) or dimethacrylate (TTEGDMA); polyethylene glycol diacrylate (PEGDA) or dimethacrylate (PEGDMA); dipropylene glycol diacrylate (DPGDA); tripropylene glycol diacrylate (TPGDA); ethoxylated neopentyl glycol diacrylate (NPEOGDA); propoxylated neopentyl glycol diacrylate (NPPOGDA); aliphatic diacrylate (ADA); alkoxylated aliphatic diacrylate (AADA); aliphatic carbonate diacrylate (ACDA); trimethylolpropane trimethacrylate (TMPTMA); ethoxylated trimethylolpropane triacrylate (TMPEOTA); propoxylated trimethylolpropane triacrylate (TMPPOTA); glyceryl proxylated triacrylate (GPTA); tris (2-hydroxyethyl)isocyanurate triacrylate (THEICTA); dipentaerythritol pentaacrylate (DPEPA); ditrimethylolpropane tetraacrylate (DTMPTTA); and alkoxylated tetraacrylate (ATTA).

Especially useful are mixtures wherein at least one monomer is a multifunctional monomer such as a diacrylate or triacrylate, as these will produce a network of crosslinks within the reacted photopolymer. The most preferred materials for use in the method of the invention are crosslinked polymers formed by photopolymerizing mixtures of ethoxylated bisphenol A diacrylate and trimethylol propane triacrylate. The index of refraction of the most preferred materials ranges from about 1.53 to about 1.56. It is not essential that the refractive index of the transparent solid material be homogeneous throughout the waveguide element. It may be advantageous to cause to be present, inhomogeneities in refractive index, such as striations or scattering particles or domains, as these inhomogeneities may further increase the divergence of light from the output of the waveguide array.

The amount of monomer in photopolymerizable material may vary widely. The amount of monomer or the total amount of a mixture of monomers is usually from about 60 to about 99.8 percent by weight of the photopolymerizable material, preferably from about 80 to about 99 percent by weight of the photopolymerizable material, and more preferably from about 85 to about 99 percent by weight of the photopolymerizable material.

As another essential component, the polymerizable material includes a photoinitiator which is activated by actinic radiation to produce activated species which lead to photopolymerization of the monomer. The photoinitiator system will contain a photoinitiator and preferably a conventional sensitizer which extends the spectral response into regions having spectral utility, e.g. the near ultraviolet region and the visible spectral regions where lasers excite and where many common optical materials are transmissive. Usually, the photoinitiator is a free radical-generating addition polymerization initiator activated by actinic light and is preferably thermally inactive at and below room temperature (e.g. about 20° C. to about 25° C.)

Illustrative of such initiators are those described in U.S. Pat. No. 4,943,112 and references cited therein. Preferred free radical initiators are 1-hydroxy-cyclohexyl-phenyl ketone (Irgacure 184); benzoin; benzoin ethyl ether; benzoin isopropyl ether; benzophenone; benzidimethyl ketal (Irgacure 651); α,α-diethyloxy acetophenone, α,α-dimethyloxy-α-hydroxy acetophenone (Darocur 1173); 1-[4-(2-hydroxyethoxy)phenyl]-2-hydroxy-2-methyl-propan-1-one (Darocur 2959); 2-methyl-1-[4-(methylthio)phenyl]-2-morpholino-propan-1-one (Irgacure 907); 2-benzyl-2-dimethylamino-1-(4-morpholinophenyl)-butan-1-one (Irgacure 369); poly{1-[4-(1-methylvinyl)phenyl]-2-hydroxy-2-methyl-propan-1-one} (Esacure KIP); [4-(4-methylphenylthio)-phenyl]phenylmethanone (Quantacure BMS); dicampherquinone; and 50% 1-hydroxycyclohexyl phenyl ketone and 50% benzophenone (Irgacure 500).

The more preferred photoinitiators includes benzidimethyl ketal (Irgacure 651); α,α-diethyloxy acetophenone; α,α-dimethyloxy-α-hydroxy acetophenone (Darocur 1173); 1-hydroxy-cyclohexyl-phenyl ketone (Irgacure 184); 1-[4-(2-hydroxyethoxy)phenyl]-2-hydroxy- 2-methyl-propan-1-one (Darocur 2959); 2-methyl-1-4-(methylthio)phenyl]-2-morpholino-propan-1-one (Irgacure 907); 2-benzyl-2-dimethylamino-1-( 4-morpholinophenyl)butan-1-one (Irgacure 369); and 50% 1-hydroxycyclohexyl phenyl ketone and 50% benzophenone (Irgacure 500). The most preferred photoinitiators are those which tend not to yellow upon irradiation and, thus, do not increase the coloration of the composition on the Gardner scale to a value of greater than 8 points on exposure to a temperature of 190° C. for 24 hours as determined by ASTM D 1544-80. Such photoinitiators include benzidimethyl ketal (Irgacure 651); α,α-dimethyloxy-a-hydroxy acetophenone (Darocur 1173); 1-hydroxy-cyclohexyl phenyl ketone (Irgacure-184); 1-[4-(2-hydroxyethoxy)phenyl]-2-hydroxy-2-methyl-propan-1-one (Darocur 2959); and 50% 1-hydroxycyclohexyl phenyl ketone and 50% benzophenone (Irgacure 500).

The amount of photoinitiator which must be present to form a gradient of substantially collimated ultraviolet light across the thickness of the photopolymerizable mixture is from about 0.1 to about 12 percent by weight based on the total weight of the photopolymerizable material. The amount of photoinitiator is preferably from about 0.5 to about 12 percent by weight, and more preferably from about 0.5 to about 8 percent by weight based on the total weight of the photopolymerizable material. It is realized that the desired gradient will be influenced not only by the concentration of the initiator but by the choice of irradiating wavelengths present in the exposure source, which may be controlled by those skilled in the art.

In addition to the essential ingredients, the photopolymerizable material may include various optional ingredients such as stabilizers, inhibitors, plasticizers, optical brighteners, release agents, chain transfer agents, other photopolymerizable monomers, and the like.

The photopolymerizable material preferably includes a stabilizer to prevent or reduce degradation which leads to property deterioration such as cracking and delamination after heat aging at 190° C. in air for 24 hrs. as defined by ASTM D 4538-90A and yellowing (coloration of greater than 8 on the Gardner Color Scale as determined by ASTM D 1544-80) after such heat aging. Such stabilizers include UV absorbers, light stabilizers, and antioxidants.

UV absorbers include hydroxyphenyl benzotriazoles, such as 2-[2-hydroxy-3,5-di(1,1-dimethylbenzyl)phenyl]-2-H-benzotriazole (Tinuvin 900); Poly(oxy-1,2-ethanediyl), α-(3-(3-(2H-benzyotriazol-2-yl)- 5-(1,1-dimethylethyl)-4-hydroxyphenyl)-1-oxopropyl)-ω-hydroxy (Tinuvin 1130); and 2-[ 2-hydroxy-3,5-di(1,1-dimethylpropyl)phenyl]-2-H-benzotriazole (Tinuvin 238) and hydroxybenzophenones such as 4-methoxy-2-hydroxybenzophenone and 4-n-octoxy-2-hydroxybenzophenone. Light stabilizers include hindered amines such as 4-hydroxy- 2,2,6,6-tetramethylpiperidine, 4-hydroxy-1,2,2,6,6-pentamethylpiperidine, 4-benzoyloxy-2,2,6,6-tetramethylpiperidine, bis(2,2,6,6-tetramethyl-4-piperidinyl)sebacate (Tinuvin 770); bis(1,2,2,6, 6-pentamethyl-4-piperidinyl)sebacate (Tinuvin 292); bis(1, 2,2,6,6-pentamethyl- 4-piperidinyl)-2-n-butyl-2-(3,5-di-tert-butyl-4-hydroxybenzyl)malonate (Tinuvin 144); and polyester of succinic acid with N-β-hydroxy-ethyl-2,2,6,6-tetramethyl-4-hydroxy-piperidine (Tinuvin 622). Antioxidants include substituted phenols such as 1,3,5-trimethyl-2, 4,6-tris( 3,5-di-tert-butyl)-4-hydroxybenzyl)benzene, 1,1,3-tris-(2-methyl-4-hydroxy-5-tert-butyl)phenyl)butane, 4,4'-butylidene-bis-(6-tert-butyl-3-methyl)phenol, 4,4'-thiobis-(6-tert-butyl-3-methyl)phenol, tris-( 3,5-di-tert-butyl-4-hydroxybenzyl)isocyanurate, cetyl-3,5-di-tert-butyl-4-hydroxybenzene (Cyasorb UV2908); 3,5-di-tert-butyl-4-hydroxybenzoic acid, 1,3,5-tris-(tert-butyl-3-hydroxy-2,6-dimethylbenzyl) (Cyasorb 1790); stearyl-3-(3,5-di-tert-butyl-4-hydroxyphenyl)proprionate (Irganox 1076); pentaerythritol tetrabis(3,5-di-tert-butyl-4-hydroxyphenyl) (Irganox 1010); and thiodiethylene-bis-(3,5-di-tert-butyl-4-hydroxy)hydrocinnamate (Irganox 1035).

The preferred stabilizers used in this invention are antioxidants. Preferred antioxidants are selected from substituted phenols such as 1,3,5-trimethyl-2,4,6-tris(3,5-di-tert-butyl)-4-hydroxybenzyl)benzene, 1,1,3-tris-(2-methyl-4-hydroxy-5-tert-butylphenyl)butane, 4,4'-butylidene-bis-(6-tert-butyl-3-methylphenol, 4,4'-thiobis-(6-tert-butyl-3-methylphenol, tris-(3,5-di-tert-butyl-4-hydroxybenzyl)isocyanurate, cetyl-3,5-di-tert-butyl-4-hydroxybenzene (Cyasorb UV 2908); 3,5-di-tert-butyl-4-hydroxybenzoic acid, 1,3,5-tris-tert-butyl-3-hydroxy-2,6-dimethylbenzyl) (Cyasorb 1790); stearyl-3-(3,5-di-tert-butyl-4-hydroxyphenyl)proprionate (Irganox 1076); pentaerythritol tetrabis(3,5-di-tert-butyl-4-hydroxyphenyl) (Irganox 1010); and thiodiethylene-bis-(3,5-di-tert-butyl-4-hydroxy)hydrocinnamate (Irganox 1035). The most preferred stabilizers include pentaerythritol tetrabis(3,5-di-tert-butyl-4-hydroxyphenyl) (Irganox 1010); thiodiethylene-bis-(3,5-di-tert-butyl-4-hydroxy)hydrocinnamate (Irganox 1035); and stearyl-3-(3,5-di-tert-butyl-4-hydroxyphenyl-)proprionate (Irganox 1076).

The amount of stabilizers in the composition may vary widely and is usually from about 0.1 to about 10 percent by weight of the photopolymerizable material. The amount of stabilizer is preferably from about 0.1 to about 5 percent by weight of the photopolymerizable material and more preferably from about 0.2 to about 3 percent by weight of the photopolymerizable material.

To make the present improved polarizer, the polarizer element 12 may be manufactured directly on the array of tapered waveguides 10 by depositing an anisotropically absorbing material such as a fully or partially conjugated oligomer or polymer and/or iodine complex under the influence of an external orienting field such as for example, an electric, magnetic, or shear field.

Figure 4A:
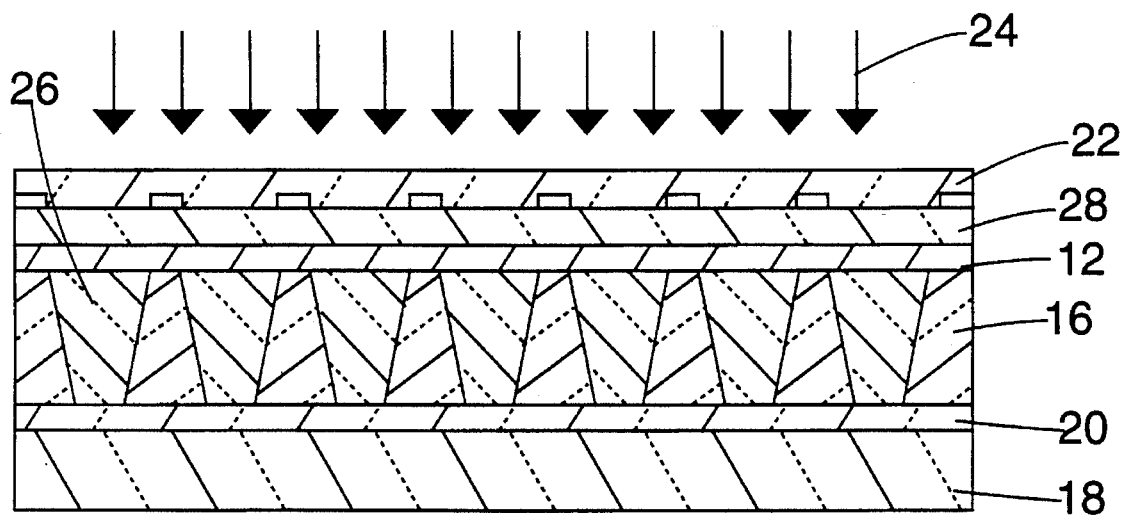
FIGS. 4A and 4B illustrates a process for the formation of the tapered waveguide array.
Figure 4B:
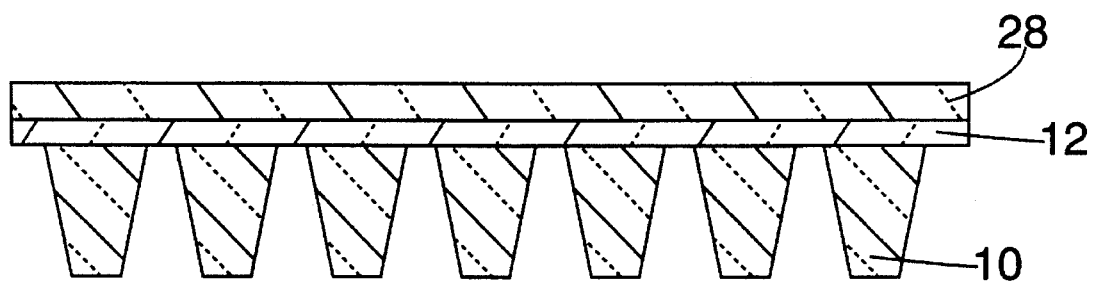

Alternatively, the array of tapered waveguides 10 may be manufactured directly on the polarizer element 12. The array of tapered waveguides 10 may be manufactured by a variety of techniques including injection molding, compression molding, hot roller pressing casting, and photopolymerization processes. A preferred technique is a photopolymerization process illustrated in FIG. 4 wherein the array of tapered waveguides 10 is formed by ultraviolet light irradiation of a layer of the photopolymerizable material through a patterned mask. In FIG. 4A, polarizer element 12 is placed on top of a layer of photopolymerizable material 16 which, in turn, is placed over a bottom support plate 18 having a release layer 20. Mask 22 bears a pattern of opaque areas which allow ultraviolet light 24 to pass through only in the areas which comprise the desired pattern of the array of tapered waveguides 10. Ultraviolet light 24, as from a mercury or xenon lamp, is directed to fall on the surface of the mask 22. Ultraviolet light 24 which passes through the clear areas of the mask 22 causes a photopolymerization reaction in the exposed regions 26 of photopolymerizable layer 16 which are directly under the clear image areas of the mask 22. No photoreaction occurs in those areas of photopolymerizable layer 16 which are shielded from the ultraviolet light by the opaque areas of mask 22. After irradiation by ultraviolet light, both mask 22 and bottom support plate 18 with release layer 20 are removed as shown in FIG. 4B. The unreacted monomers are washed away with a suitable solvent such as acetone, methanol, or isopropanol leaving a pattern of photopolymerized regions 26 on polarizer element 12. Photopolymerized regions 26 correspond to the array of tapered waveguides 10 of the present invention.

In order that the array of tapered waveguides 10 has the proper tapered shape, the optical absorption of the unreacted photopolymerizable layer 16 at the wavelengths of the ultraviolet light must be high enough such that a gradient of ultraviolet light intensity is established through the film during ultraviolet light exposure. That is, the amount of ultraviolet light available in the monomer layer to cause the initiation of the photoreaction will decrease from the top, or the image mask side, towards the bottom, or the bottom support plate side, due to the finite absorption of the monomer layer. This gradient of ultraviolet light causes a gradient in the amount of photopolymerization reaction that occurs from top to bottom, and this results in the unique tapered geometry of the developed waveguide structures, a geometry which is easily accessible with the method of the present invention. The gradient in the amount of photopolymerization which occurs from the top to the bottom of the film may be further influenced by the presence of dissolved oxygen gas in the photopolymerizable layer 16, such oxygen acting to curtail or quench the photopolymerization reaction except in those areas where all oxygen has been consumed by the free radicals produced in the photopolymerization process. Such action of dissolved oxygen gas on the progress of photopolymerization reactions is well known to those skilled in the art. Further, the requisite geometry of the photopolymer structures may be further influenced by the process of self-focussing. That is, the light falling on the surface of the monomer layer initiates photopolymerization at that surface, and since the refractive index of the solidified polymer material is higher than that of the liquid monomer, it acts to refract the light passing through it. In this manner the aerial image of light falling on the monomer nearer to the bottom of the monomer layer is altered through refraction caused by the already-polymerized material which lies above it. This effect may cause a narrowing of the resultant polymerized structure from the top surface, upon which the imaging light was directed, towards the bottom, or support plate side of the layer.

The index of refraction of interstitial regions 14 between the tapered waveguides must be less than the index of refraction of the tapered waveguides. Preferred materials for interstitial regions 14 include air, with an index of refraction of 1.00, fluoropolymer materials with an index of refraction ranging from about 1.30 to about 1.40, and silicone materials with an index of refraction ranging from about 1.40 to about 1.44. The most preferred materials are air and fluorinated polyurethane.

In a preferred embodiment of the present invention, the interstitial regions 14 between the tapered waveguides also comprise a light absorptive material, as for example light absorptive black particulate material. By utilizing a light absorptive material in interstitial regions 14, the present improved polarizer provides higher contrast and less ambient light is reflected back to the observer. It is preferred that light absorptive particles be used for the interstitial regions 14 rather than a continuous black material in order to minimize the area of black material in contact with side surfaces of the tapered waveguides. A continuous black material in interstitial regions 14 would result in excess absorption loss to light transmitted through waveguides via the mechanism of frustrated internal reflection. The light absorbing component is preferably maintained at least about 1 micron, and preferably greater than about 3 microns from the side surface of the waveguide. Any light absorptive material may be used to form the particles. Examples of useful light absorptive black particulate material include carbon lampblack powder, mixtures of carbon black and toner, and mixtures of carbon black and fluoropolymer. The light absorptive black particulate material causes the array to appear a dark matte black and provides good light transmission and little surface reflection (either specular or diffused) when observed from the viewer's side of the display device.

Referring to FIG. 1, the present improved polarizer is conveniently supplied to the user in a form ready for bonding directly to the top plate of a liquid crystal display. The improved polarizer is on a support layer 28 having an adhesive layer 30. Examples of useful materials for support layer 28 include poly(ethylene terephthalate), glass, poly(ethylene terephthalate glycol), and polycarbonate. Preferably, support layer 28 has a thickness of about 12 microns to about 100 microns. More preferably, support layer 28 has a thickness of about 12 microns to about 50 microns. Examples of useful adhesives for adhesive layer 30 include pressure sensitive adhesives, such as ethylenic adhesives and vinyl acetate adhesives; thermosetting adhesives such as epoxies, urethanes, and silicones; and photopolymerizable adhesives, such as acrylates, methacrylates, and urethanes and mixtures thereof.

Figure 5:
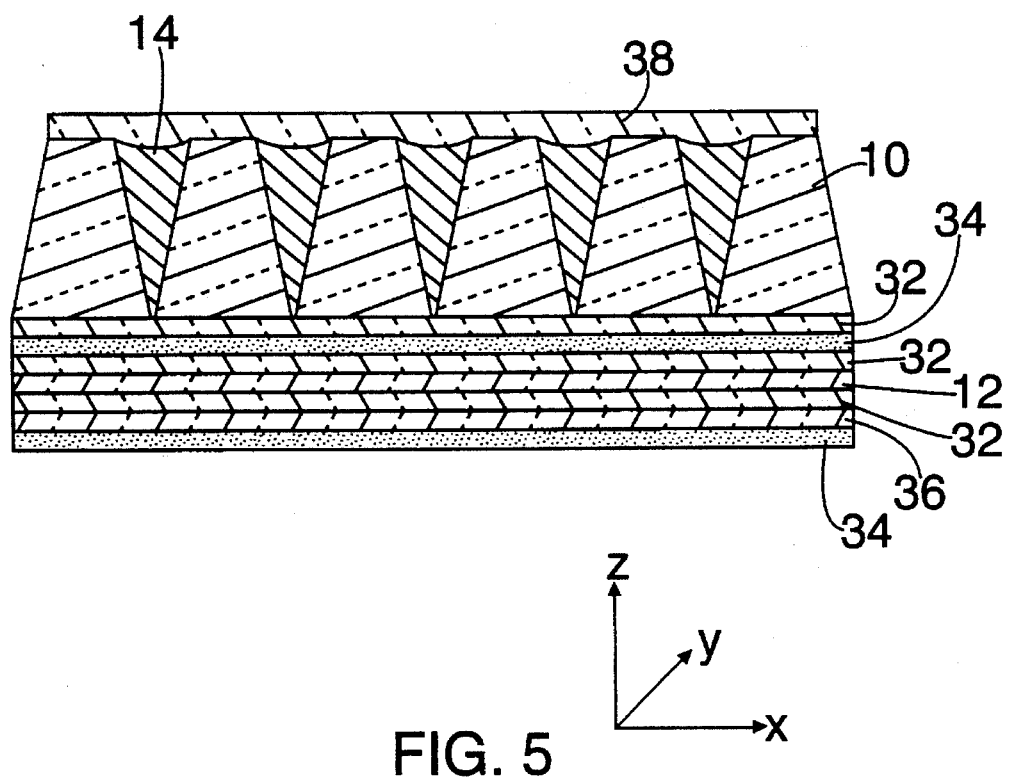
FIG. 5 illustrates another embodiment of the present improved polarizer.

In a less preferred embodiment shown in FIG. 5, the array of tapered waveguides 10 is made on a support layer 32. This first support layer 32 has an adhesive layer 34. At a minimum, support layer 32 is transparent to light within the wavelength range from about 400 to about 700 nm, as this visible wavelength region is the most desirable region in which the optical waveguides to be formed will operate. It is more preferred that the support layer 32 also transmits ultraviolet light in the region from about 250 to about 400 nm as this is the region in which many useful photoinitiators absorb light. Additionally, if it is desired to utilize the present improved polarizer in the near infrared region, from about 700 nm to about 2000 nm, then it would be preferred to use a support layer 32 which is transparent in that region as well. The index of refraction of support layer 32 may range from about 1.45 to about 1.65. The most preferred index of refraction is from about 1.50 to about 1.60. The first, second, or third support layer 32 of FIG. 5 may be made from any transparent solid material. Preferred materials are commercially available and include transparent polymers, glass, and fused silica. Useful transparent polymers include polyesters, polyacrylates and methacrylates, polystyrene, and polycarbonates. Desired characteristics of these materials include mechanical and optical stability at typical operating temperatures of the display device. Compared with glass, transparent polymers have the added advantage of structural flexibility which allows products to be formed in large sheets and then cut and laminated as necessary. The preferred materials for support layer 32 are glass and polyester such as polyethylene terephthalate. The thickness of support layer 32 may vary widely. Preferably, the thickness of support layer 32 is about 0.5 mil (0.0005 inch or 12 microns) to about 10 mil (0.01 inch or 250 microns).

Preferably, the adhesive layer(s) 34 is an organic material which is light transmissive. The first, top most, adhesive layer 34 bonds the support layer for the waveguides to the top most support layer for the polarizer element 12. The second, bottom most, adhesive layer 34 is provided to supply a means for the polarizer laminate to adhere strongly to the liquid crystal display. The thickness of adhesive layer 34 may vary widely. Usually, the thickness of adhesive layer 34 is as used in the end application such as conventional direct view flat panel display devices. In the preferred embodiments of the invention, adhesive layer 34 is less than about 1 micrometer thick. If it is determined that the waveguides may be formed directly on the bare support layer 32 of the polarizer element 12, then the first adhesive layer 34 and the first support layer 32 may be omitted.

In addition, tie layers and adhesion promoters may be employed either between the layers of FIG. 1 or 5 or on the substrate to which the polarizer is to be affixed. They may comprise all or part of the adhesive layer(s) 34. Such materials are well known to those skilled in the art, are commercially available, and will not be described herein in great detail. For example, if support layer 32 is glass, appropriate adhesion promotion may be achieved by reacting the glass surface with certain types of silane compounds including 3-(trimethoxysilyl)propyl methacrylate; 3-acryloxypropyl trichlorosilane; and trimethylsilylpropylmethacrylate. If support layer 32 is polyethylene terephthalate (PET), adhesion promotion may be provided by using an adhesion treated PET film such as Hostaphan 4500 (Hoechst-Celanese). If support layer 32 is emulsion coated, adhesion promotion may be provided by 3-acryloxypropyltrichlorosilane (Hüls America A0396).

A color filter grid array 36 is a typical display element usually incorporated within the liquid crystal display. In a multicolor display, the color filter consists of an array of red, green, and blue elements which are surrounded by a black mask. It is generally important that this element be placed very close to the liquid crystal element. The size of these elements are equal to that of a pixel. In order to avoid Moire effects, the dimension of the waveguide bases should be small with respect to the pixel (filter grid) size. A preferred linear dimension of the tapered waveguide base would be equal to or less than ¼ of the small dimension of the color filter elements. It is also desirable that the distance to the analyzer, i.e., the top (front) polarizer, be minimized. The fact that the usual design of a liquid crystal display interposes a thickness of glass between the analyzer and the liquid crystal element contributes to the problem of color shift at oblique viewing angles, because light rays which are not normal to the plane of the screen, i.e., not parallel to the z axis, cross over to adjacent, i.e., wrong, color elements. Since the polarizer of the present invention incorporates prismatic waveguides which spread light to oblique angles after it has traversed the display, a highly collimated backlight may be employed to limit this color shift problem. The incorporation of the color filter within the liquid crystal display requires a complicated multi-step procedure. Since the present improved polarizer will preferably be used with a back light source that produces light largely collimated along the z axis, the color filter grid may be optionally displaced from within the liquid crystal display to lie near to the analyzer as shown in FIG. 5, thereby greatly simplifying the manufacture of the liquid crystal display.

In FIG. 5, protective layer 38 over the output ends of the array of tapered waveguides 10 prevents mechanical damage to the output surfaces of the array of tapered waveguides 10 and also serves to confine light absorptive particulate material to interstitial regions 14 between tapered waveguides. Protective layer 38 may be an extruded or laminated overcoat. A protective layer may also be applied to the output surfaces of the array of tapered waveguides 10 before filling the interstitial regions 14 with a light absorptive black particulate material. Protective layer 38 is composed of a transparent backing material as for example the material used to form support layer 32 and optionally and preferably anti-reflective film formed from a material such as magnesium fluoride, which reduces specular reflections of ambient light from the surface of the array of tapered waveguides 10. An anti-reflective coating may also be evaporated directly on the light output ends of the tapered waveguides and interstitial regions 14. Examples of useful anti-reflective coatings are the fluoropolymers taught by commonly assigned U.S. Pat. Nos. 5,061,769; 5,118,579; 5,139,879; and 5,178,955 to Aharoni et al.

The present improved polarizer may be used in the direct-view flat panel display devices of commonly assigned U.S. patent application Ser. No. 86,414 filed Jul. 1, 1993 which is incorporated herein by reference. Such display devices are used in computer terminals, televisions, airplane cockpit displays, automotive instrument panels, and other devices that provide text, graphics, or video information. In addition, the present improved polarizer may be used to alter or improve the optical characteristics of other information displaying means such as road signs, cathode ray tube (CRT) displays, dead front displays and other text, graphic or video information displays which do not fall in the category of flat panel devices, or to alter or improve the brightness or optical characteristics of lighting systems.

The present invention is more fully illustrated by the following non-limiting Example.

EXAMPLE 1

An image was made on a transparent film of text and finely spaced lines. The image was back lighted by a fiber optic light source which had been adjusted by the use of a lens to produce light which was collimated to within ±5°. A view screen constructed with an array of tapered waveguides 10, a support layer 28, a black-filled interstitial region 14, and protective layer 38 as shown in FIG. 1 was placed directly in front of the image transparency. The image was then viewed at a 45-degree angle. The image appeared sharp. The view screen was then spaced away from the image transparency by a distance of 0.28 cm. The image at this point was significantly fuzzy in appearance, thereby illustrating the importance of minimizing the distance between the image plane and the base of the present improved polarizer. With a fixed distance of 0.28 cm, the degradation of the image was further observed to become more severe as the degree of collimation of the backlight was decreased (toward collimation angles greater than 5°).

EXAMPLE 2 AND COMPARATIVE

A polarizer of the present invention and a Comparative polarizer were constructed as follows. The Example 2 polarizer comprised interstitial regions 14 in an array of tapered waveguides 10 bonded to a polarizer element 12 such as shown in FIG. 1 through a layer of pressure sensitive adhesive to produce a polarizer wherein the distance between the polarizer element 12 and the array of tapered waveguides 10 was about 50 microns. The Comparative polarizer comprised interstitial regions 14 in an array of tapered waveguides 10 on a 75-micron thick polyethylene terephthalate support layer 32 having a pressure sensitive adhesive layer 34 such as shown in FIG. 5. The support layer 32 having an adhesive layer 34 was bonded to a 165-micron thick polyethylene terephthalate support layer 32 having a pressure sensitive adhesive layer 34 bonded to a polarizer element 12 to produce a polarizer wherein the distance between the polarizer element 12 and the array of tapered waveguides 10 was about 315 microns.

An image was created by a transparency depicting text at point sizes of 4 points to 8 points in single point steps. This image was illuminated by an uncollimated light source produced by a white pattern on a CRT computer monitor screen. Each of the polarizers was placed over the transparency and the image was viewed at an angle of 45 degrees to the normal. The image viewed through the Comparative polarizer was fuzzier and blurrier than the image viewed through the Example 2 polarizer. The relative difference was such that text down to a point size of 5 points was readable through the Example 2 polarizer while text down to a point size of only 7 points was readable through the Comparative polarizer.

Using the Example 2 and Comparative polarizers, a second test was performed by placing each polarizer over an image created by a liquid crystal display screen illuminated by a light source collimated to within about 12 degrees to the screen normal. The screens were oriented such that the polarizer element within the screen was oriented parallel to the outermost polarizer of the display. Again, the image was viewed at an angle of 45 degrees to the normal. The image viewed through the Example 2 system was significantly sharper than the image viewed through the Comparative system having a much larger spacing between the array of tapered waveguides 10 and polarizer element 12.

What is claimed is:

1. An improved polarizer comprising:
   (a) a polarizer element; and
   (b) an array of tapered waveguides in substantial contact with said polarizer element wherein:
      (i) the tapered end of each of said waveguides extends outward from said polarizer element,
      (ii) each of said waveguides has a light input surface adjacent to said polarizer element (a) and a light output surface distal from said light input surface,
      (iii) the area of the light input surface of each of said waveguides is greater than the area of its light output surface, and
      (iv) the waveguides in said array are separated by interstitial regions with a lower refractive index than the refractive index of said waveguides.

2. The improved polarizer of claim 1 which further comprises:
   (c) a substrate wherein said polarizer element (a) separates said array of tapered waveguides (b) from said substrate (c); and
   (d) an adhesive layer wherein said substrate (c) separates said polarizer (a) from said adhesive layer (d).

3. The improved polarizer of claim 2 which further comprises:
   (e) a protective layer adjacent to the tapered end of said waveguides.

4. The improved polarizer of claim 3 which further comprises:
   (f) a liquid crystal cell wherein said adhesive layer (d) separates said substrate (c) from said liquid crystal cell (f).

5. The improved polarizer of claim 4 which further comprises:
   (g) a color filter grid array.

6. The improved polarizer of claim 1 wherein said polarizer element is made from at least one member selected from the group consisting of fully or partially conjugated oligomers or polymers and complexes of iodine with organic oligomers or polymers.

7. The improved polarizer of claim 1 wherein the cross section of said waveguides in a plane parallel to said polarizer element is selected from the group consisting of circular, square, and hexagonal.

8. The improved polarizer of claim 7 wherein said polarizer element is oriented to provide light polarized parallel to the plane determined by the horizontal viewing axis and the axis normal to said horizontal viewing axis.

9. The improved polarizer of claim 1 wherein the cross section of said waveguides in a plane parallel to said polarizer element is selected from the group consisting of elliptical and rectangular.

10. The improved polarizer of claim 9 wherein said polarizer element is oriented to provide light polarized parallel to the plane determined by the minor axis of said waveguide cross section and the axis normal to said waveguide cross section.

11. The improved polarizer of claim 1 wherein said array of tapered waveguides (b) is made from at least one photopolymerized monomer selected from the group consisting of methyl methacrylate; n-butyl acrylate; 2-ethylhexyl acrylate; isodecyl acrylate; 2-hydroxyethyl acrylate; 2-hydroxypropyl acrylate; cyclohexyl acrylate; 1,4-butanediol diacrylate; ethoxylated bisphenol A diacrylate; neopentylglycol diacrylate; diethyleneglycol diacrylate; diethylene glycol dimethacrylate; 1,6-hexanediol diacrylate; trimethylol propane triacrylate; pentaerythritol triacrylate; pentaerythritol tetra-acrylate; and mixtures thereof.

12. The improved polarizer of claim 1 wherein said array of tapered waveguides (b) is made from a photopolymerized mixture of ethoxylated bisphenol A diacrylate and trimethylol propane triacrylate.

13. The improved polarizer of claim 1 wherein said interstitial regions with a lower refractive index than the refractive index of said waveguides is made from fluoropolymer.

14. The improved polarizer of claim 13 wherein said fluoropolymer additionally comprises carbon black.

15. The improved polarizer of claim 1 wherein said interstitial regions with a lower refractive index than the refractive index of said waveguides is made from fluorinated polyurethane.

16. The improved polarizer of claim 15 wherein said fluorinated polyurethane additionally comprises carbon black.

17. The improved polarizer of claim 1 wherein the cross section of the light input surface of each of said waveguides is from about 10 microns to about 100 microns and the cross section of the light output surface of each of said waveguides is from about 5 to about 50 microns.

18. The improved polarizer of claim 1 wherein said polarizer element (a) is manufactured directly on said array of tapered waveguides (b).

19. The improved polarizer of claim 1 wherein said array of tapered waveguides (b) is manufactured directly on said polarizer element (a).

20. The improved polarizer of claim 1 wherein the distance between said polarizer element (a) and said array of tapered waveguides (b) is less than about 250 microns.

21. The improved polarizer of claim 1 wherein the distance between said polarizer element (a) and said array of tapered waveguides (b) is from about 25 microns to about 0 microns.

* * * * *